Aug. 21, 1951     B. FISK ET AL     2,564,682
PHASE MAINTAINING SYSTEM
Filed May 13, 1948     2 Sheets—Sheet 1
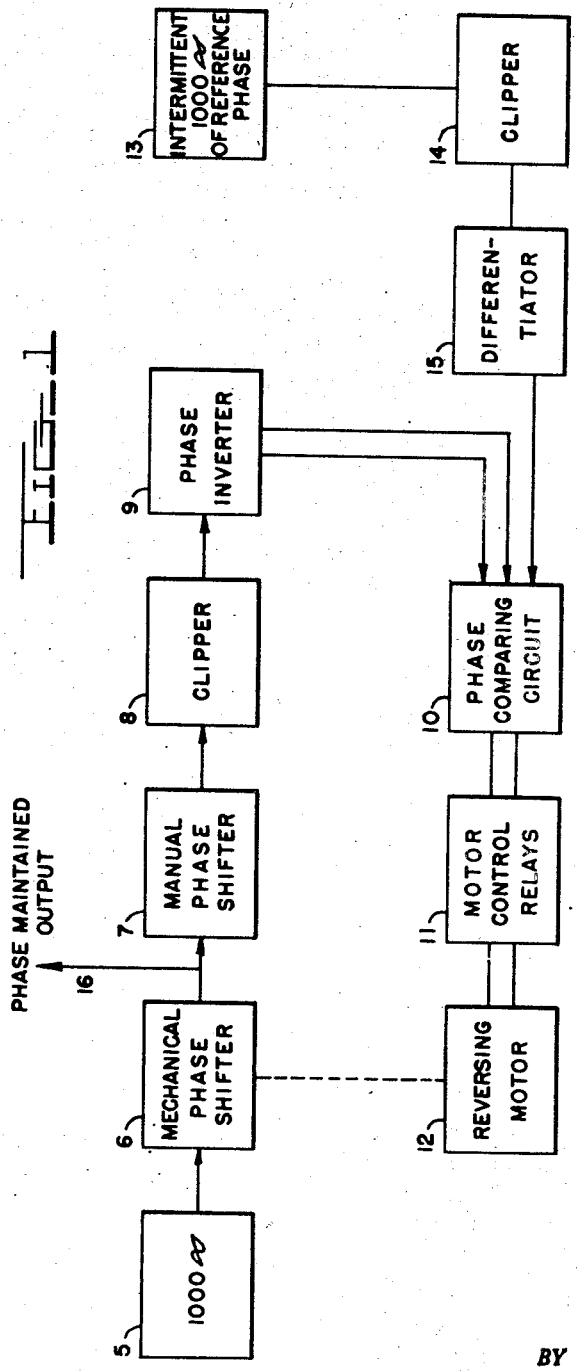
INVENTORS
BERT FISK
CHARLES L. SPENCER
BY
ATTORNEY

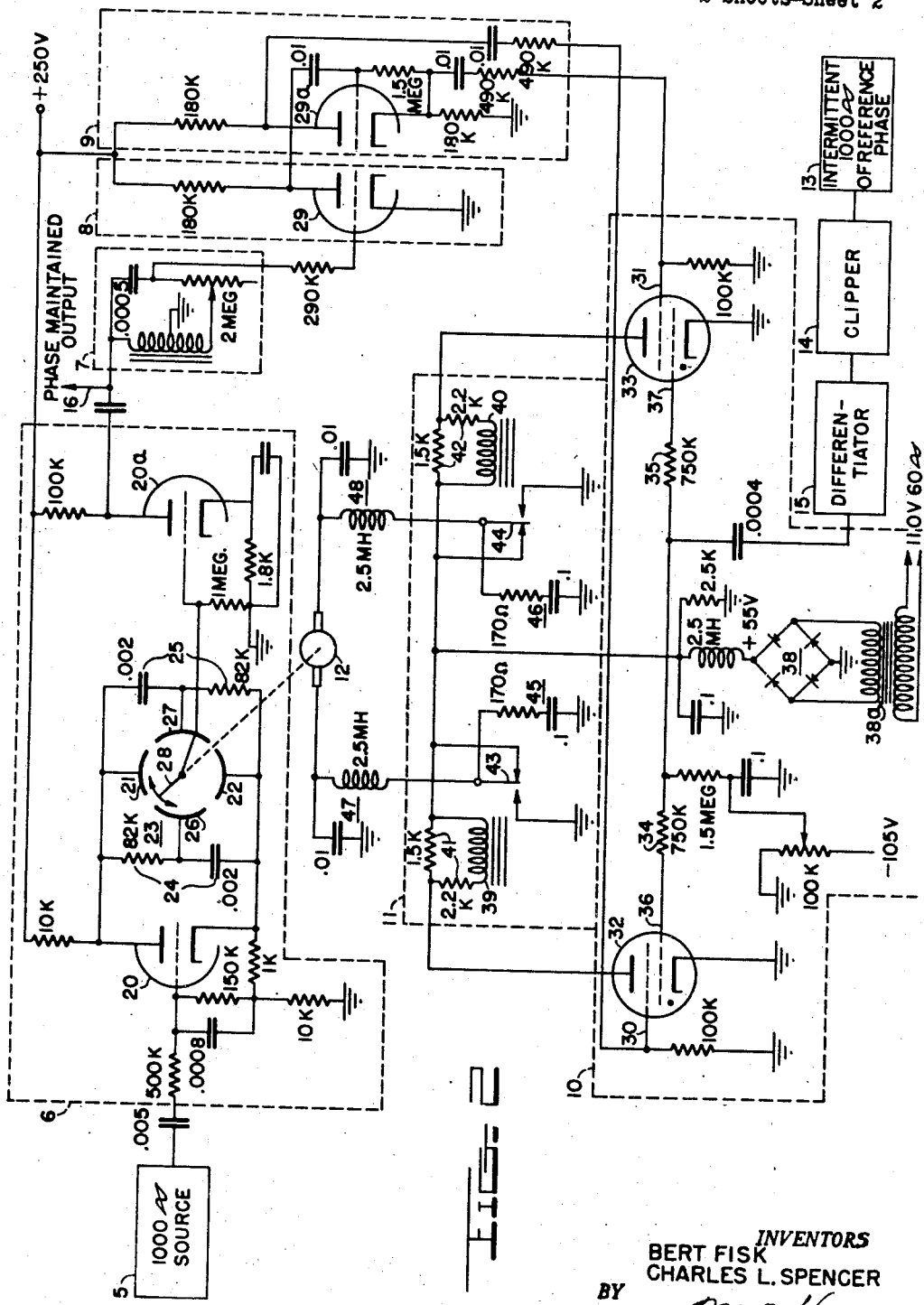

Patented Aug. 21, 1951

2,564,682

UNITED STATES PATENT OFFICE 2,564,682

PHASE MAINTAINING SYSTEM

Bert Fisk and Charles L. Spencer,
Washington, D. C.

Application May 13, 1948, Serial No. 26,908

12 Claims. (Cl. 323—101)

(Granted under the act of March 3, 1883, as
amended April 30, 1928; 370 O. G. 757)

This invention relates generally to automatic phase maintaining systems and more particularly to a system for maintaining a selected phase relation between a pair of alternating voltages having substantially the same frequency.

There are many applications in the electronic art where it is essential to maintain a particular phase relation between a pair of signals. In some types of facsimile equipment for example, it is necessary to provide a locally generated signal which is in exact phase synchronization with an intermittent received signal, or in some predetermined phase relation. An exact duplication of the frequency will provide only a stable phase relation and not necessarily phase synchronization. However, any desired phase relation can be established by physically shifting the phase of the locally generated signal in the proper direction in response to a phase error between it and the received signal. This action will, at the same time, correct frequency drifting.

An inherent difficulty in all corrective systems operating in response to the error to be corrected is the tendency to over compensate, causing a hunting or oscillatory corrective action. Prior art phase corrective systems, in order to overcome this difficulty and still provide reasonable accuracy, have been extremely complicated, bulky, and expensive.

Accordingly, it is an object of this invention to provide a phase correcting system having anti-hunting action inherent in its operation.

It is another object of this invention to provide a phase correcting system providing a high degree of accuracy with a minimum of apparatus.

It is another object of this invention to provide a simplified phase corrective system utilizing pulse shaping circuits to produce, a high degree of accuracy with a minimum of apparatus.

Other objects and features of this invention will be apparent from the following description and appended drawings, wherein;

Fig. 1 is a block diagram of the basic components of this invention and,

Fig. 2 is a schematic diagram of a preferred embodiment of this invention.

Briefly, this invention synchronizes two signals by squaring each, then differentiating the first squared signal and applying the second squared signal through a phase inverter. The differentiated pulse produced from the first signal is compared in phase with the leading edges of the phase opposed components of the second signal on separate grids of a pair of gas tubes. If the pulse fails to coincide with the leading edges of the phase opposed square waves, one or the other of the tubes will conduct, but not both. Relays are provided in the plate circuits so that if either tube fires alone, current will be supplied to the armature of a motor in a direction determined by the tube which fired, thus causing the motor to run in a particular direction. The motor is geared to a mechanical phase shifter which adjusts the phase of the second signal. The relays are arranged so that if both tubes are fired or both are nonconducting, the armature winding of the motor is short-circuited. Immediate damping of the corrective action is thereby provided and hunting avoided.

Referring now to Fig. 1 in detail, an exemplary frequency of 1000 cycles has been chosen for the purpose of illustration and is locally generated by block 5. This signal is applied to a motor operated phase shifter 6. The output 16 of this phase shifter is synchronized in phase with a 1000 cycle signal 13 of reference phase, which may be occurring intermittently. To establish phase synchronism, output 16 must be compared in phase with the signal 13.

Accordingly, the output 16 is applied to a manual phase shifter 7, the output from 7 is squared by a clipper circuit 8 and then applied to a phase inverter 9 to produce two phase opposed square wave outputs. The reference signal 13 is like-wise squared by another clipper 14 and then differentiated in block 15 to produce a pulse coincident with the initiation of each cycle of the reference signal 13. The two phase opposed outputs from block 9 are compared in phase with the differentiated pulses from block 15 in a phase comparing circuit 10. As will be explained in detail below in reference to Fig. 2, if the differentiated pulses are out of phase with the leading edges of the phase opposed squared waves, the motor control relays 11 energize reversible motor 12. The motor 12 drives phase shifter 6. The phase shifter 6 will be driven until phase coincidence is obtained, at which time the motor control relays 11 stop the rotation of the motor 12.

The manual phase shifter 7 may be used to prevent the system from stabilizing with a 180° phase shift between signals 16 and 13, or may be used to maintain a constant phase difference between said signals.

Referring now to Figure 2 in detail, a 1000 cycle signal from source 5 is coupled to the grid of a triode phase inverter 20. The phase opposed outputs of tube 20 are applied to opposite stator plates 21 and 22 of a rotary phase shifting condenser 23. The respective phase opposed outputs of tube 20 are oppositely shifted 90 degrees in phase by means of a pair of resistance capacitance phase shifting networks 24 and 25. These 90 degree phase shifted signals are in push-pull relation and in quadrature relation to the push-pull outputs from tube 20 and are applied respectively to the remaining stator plates 26 and 27 of the phase shifting condenser 23. It will be seen, therefore, that the 1000 cycle signal appears in phase quadrature on respective plates 21, 22, 26 and 27 of the phase rotating condenser 23, and that by rotating rotor 28 of said condenser the 1000 cycle signal may be taken off with any desired amount of phase shift. Since the signal from the rotor of the phase shifting condenser is small, it is applied to an amplifier 20a, the output of this amplifier is the phase maintained output 16.

The output 16 is applied to a manual phase shifter 7. This manual phase shifter may be of any conventional type capable of providing a phase shift of the order of 150°. The output of the manual phase shifter 7 is applied to a conventional clipper amplifier 8 whose output is applied to a conventional phase inverter 9. In the preferred embodiment, the clipper 8 and phase inverter 9 will utilize a dual triode tube 29 and 29a. By suitably biasing the phase inverter 9, as in accordance with the circuit values shown in Fig. 2, it will assist in clipping the input signal to provide well defined square wave outputs.

The phase opposed outputs from inverter 9 are applied respectively to the shield grids 30 and 31, of a pair of gas tubes 32 and 33 in the phase comparing circuit 10. The pulse from differentiator 15 is applied through isolating resistors 34 and 35 to the respective control grids 36 and 37 of said gas tubes 32 and 33. The gas tubes are rendered normally nonconducting by a fixed negative bias applied to their control grids 36 and 37. Although fed by a common signal and bias supply, grids 36 and 37 are interconnected only b the series connection of said isolating resistors 34 and 35. This is to prevent the heavy grid current in a conducting tube from greatly increasing the negative bias on the other tube. It will be noted that means for forming a pulse from the intermittent 1000 cycle reference signal 13 is shown only by block diagram in Fig. 2. This is because the reference signal may generally be found in pulse form somewhere within the apparatus with which this phase maintaining system is being used and auxiliary pulse shaping circuits are accordingly not required.

The voltage supply for gas tubes 32 and 33 is the 55 volt output of bridge rectifier 38, said bridge rectifier is supplied through an isolating transformer 38a from the conventional 110 volt 60 cycle line. The transformer could be eliminated if neither side of the 110 volt line were grounded. The output of bridge rectifier 38, which has a 120 cycle ripple, is applied to the gas tube plates without filtering, thereby insuring periodic deionization of the gas tubes. The plate supply bath of said tubes includes the motor control relays 11. Tube 32 is supplied through relay 39 and resistors 41, and tube 33 is supplied through relay 40 and resistors 42. Resistors 41 and 42 are employed to lower the voltage on the anodes of the gas tubes during conduction, thereby facilitating their deionization. Each relay is provided with a single pole double throw switching action by means of switching arms 43 and 44. When the relays are energized the movable ends of their respective switching arms 43 and 44 are connected to a common ground; when said relays are not energized, the same ends of their respective switching arms are connected to the 55 volt output of rectifier 38. Thus it will be seen that when both relays are in the same position their respective switching arms are connected to the same point in the circuit and, therefore, a short circuit exists between the switching arms. A pair of resistance capacitance networks 45 and 46 respectively connect each switching arm to ground to minimize sparking at the relay contacts.

The stationary ends of switching arms 43 and 44 are respectively connected to opposite armature brushes of a reversible motor 12 through suitable filtering networks 47 and 48, which minimize interference from the motor brushes. The motor 12 is preferably of the direct current type having a permanent magnet field, so that the rotation of its armature may be reversed by reversing the direction of the current applied to the armature brushes. The armature of motor 12 is connected mechanically by gears which are not shown to the rotor 28 of the phase shifting condenser 23. This condenser rotor is preferably driven through a 40 to 1 worm gear drive. During continuous operation the motor will drive the condenser rotor 28 through one completer evolution in about one and one half seconds.

The operation of the phase comparing circuit 10 is as follows: Gas tubes 32 and 33 are biased to conduct only upon the simultaneous application of a positive pulse from differentiator 15 upon their respective control grids 36 and 37 and a positive voltage from the phase inverter 9 upon their respective shield grids 30 and 31. Since the square wave pulses from phase inverter 9 are 180 degrees out of phase, gas tubes 32 and 33 cannot be fired simultaneously unless the differentiated pulse coincides in time with the leading or trailing edges of said square wave pulses so that there will be a positive voltage component upon each shield grid during the occurrence of the differentiated pulse. If the differentiated pulse occurs during an intermediate portion of the square wave, one shield grid will be biased positively and the other negatively and therefore only one of the gas tubes will conduct. However, if the differentiated pulse coincides with the leading or the trailing edges of the square wave pulses, each shield grid 30 and 31 will be biased at least momentarily be a positive excursion of the square wave causing the tubes to fire and their respective grids to lose control. As a result, relays 39 and 40 will each be energized, their switching arms 43 and 44 will each connect to the rectifier output and the armature winding of motor 12 will be short circuited. It would seem probable that the gas tube having the trailing edge of a positive square wave upon its shield grid would fire slightly before the gas tube having the leading edge of a positive square wave upon its shield grid, however, this difference is too slight to cause an appreciable rotation of the motor armature.

Suppose, for example, that an out of phase condition exists: If the pulse from differentiator 15 reaches grid 37 of tube 33 while its grid 31 is biased by a positive square wave from phase inverter 9, tube 33 will fire. But the square wave on grid 30 of tube 32 will be negative at that time and tube 32 will not fire. Therefore, only relay 40 will be energized, its switching arm 44 will connect to ground, and since switching arm 43 of relay 39 is connected to positive 55 volts, the circuit through the armature of motor 12 will be completed and current will flow from left to right through the motor. Motor 12 will then drive the rotor 28 of phase shifting condenser 23 to shift the phase of 1000 cycle signal from source 5. The motor will continue to rotate the condenser until the leading or trailing edge of the square wave reaches grid 30 of tube 32 in time coincidence with the application of a pulse on grid 36. When this condition is reached in tube 32 the tube will fire thereby energizing relay 39 and grounding the movable switching arm 43. This switching action immediately grounds both sides of the armature winding of motor 12, thereby stopping the motor immediately and preventing overcompensation and thus preventing hunting. Tubes 32 and 33 will then remain conducting until their anode voltage is lowered to the quenching point by the ripple in the anode supply voltage from rectifier 38. Upon becoming nonconducting tubes 32 and 33 are again ready to compare output 16 with reference phase 13. If the next succeeding pulse from differentiator 15 coincides with the leading edges of the square wave from phase inverter 9, both tubes will fire simultaneously, and the motor armature will remain shorted by the simultaneous action of both switches, hence no phase correction will be made. Again the gas tubes will remain conducting until cut off by the ripple in the 55 volt anode supply. Gas tubes 32 and 33 will continue to fire and quench simultaneously without making a phase correction until the leading edges of the square wave of phase inverter 9 again fail to coincide with the pulses from differentiator 15.

A dual triode tube like tube 29 is preferably used for the phase inverter and amplifier, 20 and 20A, of the mechanical phase shifter 6. It will be seen, therefore, that only four tubes are required for the entire phase maintaining system, that the anti-hunting feature is inherent in the operation of the relays in controlling the motor, and that a very precise synchronism is provided by the measurement of time coincidence between sharp pulses and the steep edges of square waves.

Although a specific embodiment of this invention has been herein disclosed and described, it is to be understood that it is merely illustrative of this invention and modifications may, of course, be made without departing from the spirit and scope of the invention as defined in the appended claims.

The invention described herein may be manufactured and used by or for the Government of the United States of America for governmental purposes without the payments of any royalties thereon or therefor.

What is claimed is:

1. In a system for maintaining a predetermined phase relationship between first and second signals, phase shifting means for shifting the phase of said second signal, an electric motor adapted to control said phase shifting means, said motor having a direction of rotation determined by the polarity of the current supplied thereto, relay means normally short-circuiting said motor but operative in response to a divergence from said predetermined phase relationship to supply current of either polarity thereto, phase comparison means for controlling said relay means including a pair of coincidence tubes for comparing the time relation of said first signal and said phase shifted second signal, an unfiltered, rectified, alternating supply source connected to said relay means to supply power to said coincidence tubes and said motor.

2. In a system for maintaining a predetermined phase relationship between first and second signals, phase shifting means for shifting the phase of said second signal, an electric motor adapted to control said phase shifting means, said motor having a direction of rotation determined by the polarity of the current supplied thereto, relay means normally short-circuiting said motor but operative in response to a divergence from said predetermined phase relationship to supply current of either polarity thereto, a clipper amplifier for squaring the wave shape of said second signal, a phase inverter for reproducing said squared second signal in phase opposition, phase comparison means for controlling said relay means including a pair of coincidence tubes for comparing the time relation of said first signal and said phase opposed square waves.

3. In a system for maintaining a predetermined phase relationship between first and second signals, phase shifting means for shifting the phase of said second signal, an electric motor adapted to control said phase shifting means, said motor having a direction of rotation determined by the polarity of the current supplied thereto, relay means operative to control the polarity of current supplied to said motor, a clipper amplifier for squaring the wave shape of said second signal, a phase inverter for reproducing said squared second signal in phase opposition, phase comparison means including a pair of gas discharge coincidence tubes each having a pair of grids receiving respectively one of the phase opposed square waves and the second signal, an unfiltered, rectified, alternating supply source connected to said relay means to supply power to said gas tubes and said motor, said gas tubes being operative to control said relay means in response to a divergence from said predetermined phase relationship.

4. In a system for maintaining a predetermined phase relationship between first and second signals, first and second phase shifting means for shifting the phase of said second signal, an electric motor adapted to control said first phase shifting means, said motor having a direction of rotation determined by the polarity of the current supplied thereto, relay means for controlling the polarity of current supplied to said motor, a clipper amplifier for squaring the wave shape of said phase shifted second signal, a phase inverter for reproducing said squared second signal in phase opposition, phase comparison means including a pair of gas discharge coincidence tubes each having a pair of grids receiving respectively one of the phase opposed square waves and the second signal, an unfiltered, rectified, alternating supply source for said gas tubes, said source being supplied to said gas tubes through said relay means, said gas tubes being operative to control said relay means in response to a divergence from said predetermined phase relationship.

5. In a system for maintaining a predetermined phase relationship between first and second signals, phase shifting means for shifting the phase of said second signal, an electric motor adapted to control said phase shifting means, said motor having a direction of rotation determined by the polarity of the current supplied thereto, relay means normally short-circuiting said motor and operative upon energization to supply current of either polarity thereto, pulse-producing differentiating means operative to produce a pulse in response to the initiation of each cycle of the first signal, phase comparison means for controlling said relay means including a pair of coincidence tubes for comparing the time relation of said differentiated first signal and said phase shifted second signal, an unfiltered, rectified, alternating supply source connected to said relay means to supply power to said coincidence tubes and said motor.

6. In a system for maintaining a predetermined phase relationship between first and second signals, phase shifting means for shifting the phase of said second signal, an electric motor adapted to control said phase shifting means, said motor having a direction of rotation determined by the polarity of the current supplied thereto, relay means normally short-circuiting said motor and operative upon energization to supply current of either polarity thereto, pulse-producing differentiating means operative to produce a pulse in response to the initiation of each cycle of the first signal, a clipper amplifier for squaring the wave shape of said phase shifted second signal, a phase inverter for reproducing said square waves in phase opposition, phase comparison means for controlling said relay means including a pair of coincidence tubes for comparing the time relation of said differentiated first signal and said phase opposed square waves.

7. In a system for maintaining a predetermined phase relationship between first and second signals, phase shifting means for shifting the phase of said second signal, an electric motor adapted to control said phase shifting means, said motor having a direction of rotation determined by the polarity of the current supplied thereto, relay means normally short-circuiting said motor and operative upon energization to supply current of either polarity thereto, a clipper amplifier for squaring the wave shape of said phase shifted second signal, a phase inverter for reproducing said square waves in phase opposition, pulse-producing differentiating means operative to produce a pulse in response to the initiation of each cycle of the first signal, phase comparison means including a pair of gas discharge coincidence tubes each having a pair of grids receiving respectively one of the phase opposed square waves and the differentiated second signal, an unfiltered, rectified, alternating supply source connected to said relay means to supply power to said gas tube and said motor, said gas tubes being operative to control said relay means in response to a divergence from said predetermined phase relationship.

8. In a system for maintaining a predetermined phase relationship between first and second signals, first and second phase shifting means for shifting the phase of said second signal, an electric motor adapted to control said first phase shifting means, said motor having a direction of rotation determined by the polarity of the current supplied thereto, relay means normally short-circuiting said motor and operative upon energization to supply current of either polarity thereto, a clipper amplifier for squaring the wave shape of said phase shifted second signal, a phase inverter for reproducing said squared second signal in phase opposition, pulse-producing differentiating means operative to produce a pulse in response to the initiation of each cycle of the first signal, phase comparison means including a pair of gas discharge coincidence tubes each having a pair of grids receiving respectively one of the phase opposed square waves and the differentiated second signal, an unfiltered, rectified, alternating supply source for said gas tubes, said source being supplied to said gas tubes through said relay means, said gas tubes being operative to control said relay means in response to a divergence from said predetermine phase relationship.

9. In a phase controlling system, a phase discrimination circuit comprising, a pair of coincidence tubes, means applying a sharp pulse representative of the phase of a first signal to each tube, means converting a second signal to a square wave, means respectively applying said square wave in opposite phase to each of said tubes, phase correcting means for one of said signals, and control means in the supply path to said tubes for controlling said phase correcting means responsive to the respective conductive conditions of said tubes.

10. In a phase controlling system, a phase discrimination circuit comprising, a pair of coincidence tubes each having a pair of grids, means applying a sharp pulse representative of the phase of a first signal to a grid of each tube, means converting a second signal to a square wave, means respectively applying said square wave in opposite phase to the other grid of each of said tubes, phase correcting means for one of said signals, and control means in the supply path to said tubes for controlling said phase correcting means responsive to the respective conductive conditions of said tubes.

11. In a phase controlling system, a phase discrimination circuit comprising, a pair of gas discharge tubes each having a pair of grids, means biasing each tube non-conducting in the absence of predetermined simultaneous positive signals on both grids, means applying a sharp pulse representative of the phase of a first signal on a corresponding grid of each tube, means converting a second signal to a square wave, means respectively applying said square wave in opposite phase to the other grid of each of said tubes, phase correcting means for one of said signals, control means in the supply path to said tubes for controlling said phase correcting means while said tubes have different conductive conditions, and means for periodically quenching said tubes.

12. In a phase controlling system, a phase discrimination circuit comprising, a pair of gas discharge tubes each having a pair of grids, means biasing each tube non-conducting in the absence of predetermined simultaneous positive signals on both grids, means applying a sharp pulse representative of the phase of a first signal on a corresponding grid of each tube, means converting a second signal to a square wave, means respectively applying said square wave in opposite phase to the other grid of each of said tubes, phase correcting means for one of said signals, control means in the supply path to said tubes for controlling said phase correcting means while said tubes have different conductive conditions, and an unfiltered, rectified, alternating current supply for said tubes having a frequency much lower than that of said signals.

BERT FISK.
CHARLES L. SPENCER.

REFERENCES CITED

The following references are of record in the file of this patent:

UNITED STATES PATENTS

| Number | Name | Date |
|---|---|---|
| 2,308,620 | Lear | Jan. 19, 1943 |
| 2,371,905 | Mathes | Mar. 20, 1945 |
| 2,429,636 | McCoy | Oct. 28, 1947 |
| 2,435,965 | Hartig | Feb. 17, 1948 |